(12) United States Patent
Ozdamar

(10) Patent No.: US 6,990,944 B2
(45) Date of Patent: *Jan. 31, 2006

(54) MOTOR WITH ROTARY CONNECTING ROD BOLT

(76) Inventor: Hasan Basri Ozdamar, Organize Sanayi Bolgesi, Caddesi No. 15, Kaysari (TR) 38400

( * ) Notice: Subject to any disclaimer, the term of this patent is extended or adjusted under 35 U.S.C. 154(b) by 0 days.

This patent is subject to a terminal disclaimer.

(21) Appl. No.: 11/063,129

(22) Filed: Feb. 22, 2005

(65) Prior Publication Data

US 2005/0139187 A1 Jun. 30, 2005

Related U.S. Application Data

(63) Continuation of application No. 10/470,135, filed as application No. PCT/TR02/00002 on Jan. 24, 2002, now Pat. No. 6,857,412.

(30) Foreign Application Priority Data

Jan. 24, 2001 (TR) ................................ 2001/00229

(51) Int. Cl.
*F02B 75/32* (2006.01)
(52) U.S. Cl. ................................ 123/197.1; 123/197.4; 74/52
(58) Field of Classification Search ............. 123/197.1, 123/197.4; 74/52
See application file for complete search history.

(56) References Cited

U.S. PATENT DOCUMENTS 4,026,252 A 5/1977 Wrin
5,170,757 A 12/1992 Gamache

FOREIGN PATENT DOCUMENTS

FR 804 164 A 10/1936
FR 930 438 A 1/1948
GB 477 016 A 12/1937
WO WO 86 07115 A 12/1986

*Primary Examiner*—Noah P. Kamen
(74) *Attorney, Agent, or Firm*—Ellis & Venable, P.C.

(57) ABSTRACT

The motor according to the present invention consists of a piston (1), cylinder (2), connecting rod (3), connecting rod rotary bolt gear wheel (4), connecting rod rotary bolt (5), crank shaft (6), crank shaft bolt (7), double faced gear wheel (9) and other gear wheels (10, 11, 12). As the connecting rod (3) is moved by the connecting rod rotary bolt gear wheel (4) that moves together with the connecting rod rotary bolt (5), without being directly dependent on the movement of the crank shaft bolt (7) although the connecting rod (3) is connected to the crank shaft (6) and to the piston (1); the crank shaft (6) moves independently of the connecting rod (3). This provides the difference between the travel path of the piston (1) between the lower and upper dead points, and the rotational diameter of the crank shaft bolt (7). In this case, the connecting rod (3) makes an elliptical movement on the crank shaft bolt (7) instead of a circular movement.

1 Claim, 7 Drawing Sheets

MOTOR WITH ROTARY CONNECTING ROD BOLT

The present invention is a Continuation Application of the U.S. application Ser. No. 10/470,135 entitled Motor with Rotary Connecting Bolt, filed in the name of Ozdamar, Hasan on Jul. 23, 2003, which is a 371 of PCT/TR02/00002 filed on Jan. 24, 2002, now U.S. Pat. No. 6,857,412, with a priority date of Jan. 24, 2001.

BACKGROUND OF THE INVENTION

1. Field of the Invention

The present invention relates to motors wherein the movement of the crank shaft is independent of the movement of the connecting rod.

2. Discussion of Related Art

In the state of art, the connecting rod is directly connected onto the crank shaft bolt in classic motors. Piston is connected to the other end of the connecting rod. In this technique, the diameter of the circle (area) of rotation of the crank shaft bolt is equal to the piston stroke.

SUMMARY OF THE INVENTION

The object of the present invention is to provide a certain degree of independence in the movement of the connecting rod with respect to the crank shaft. Another object of the invention is to ensure that the distance which the piston travels between the lower dead point and the upper dead point is different than the rotation diameter of the crank shaft bolt Yet one more object of the invention is to ensure that the admission strokes and exhaust strokes are different than the compression and expansion strokes.

BRIEF DESCRIPTION OF THE DRAWINGS

The motor with rotary connecting rod bolt, realized to attain the above mentioned objects of the present invention, has been illustrated in the attached drawings, wherein.

Figure 1:
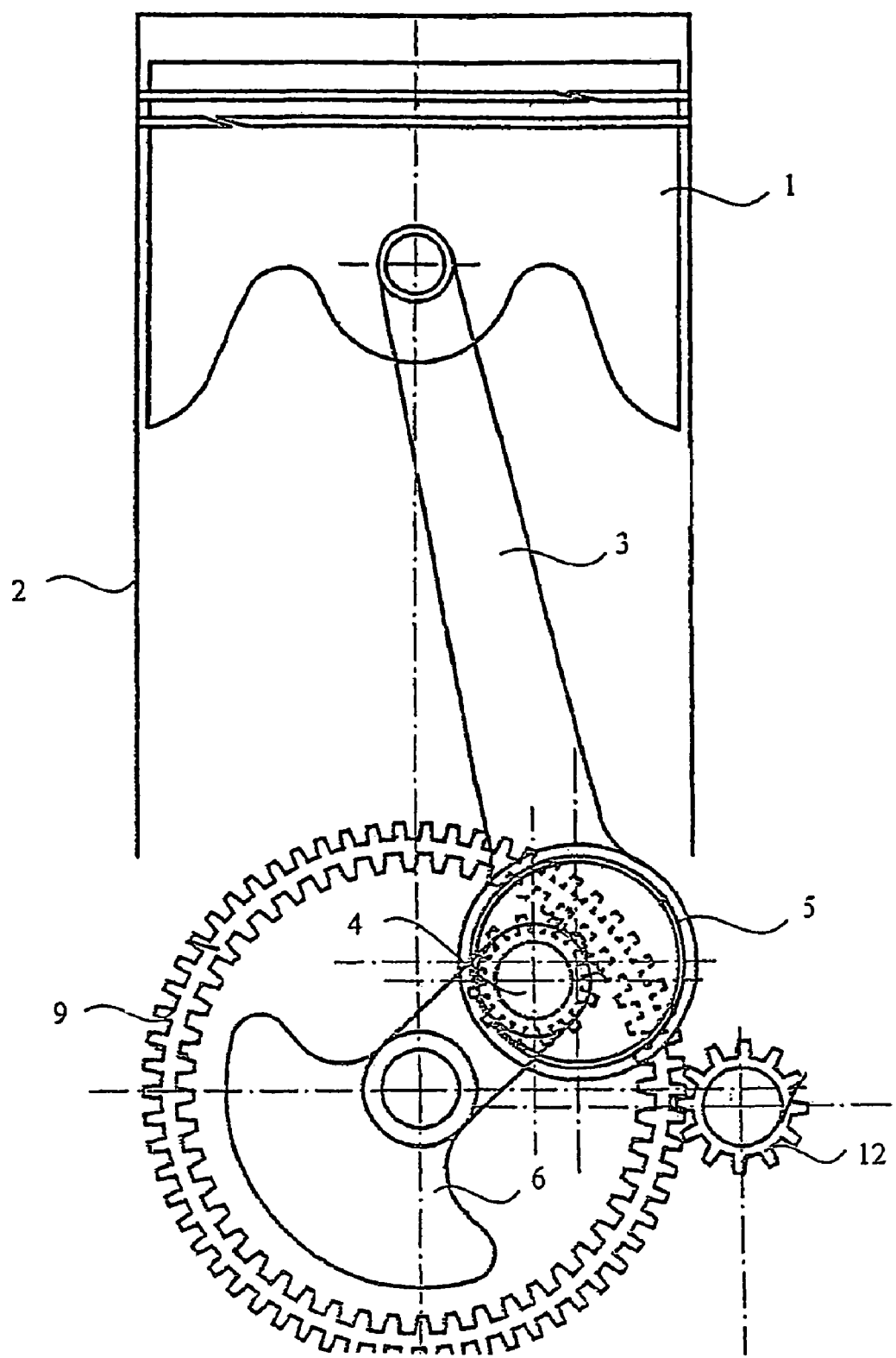
FIG. 1, is the schematic view of the motor with rotary connecting rod.

The components shown in the drawings are given reference numerals as follows
1. Piston
2. Cylinder
3. Connecting rod
4. Connecting rod rotary bolt gear wheel
5. Connecting rod rotary bolt
6. Crank shaft
7. Crank shaft bolt
8. Crank shaft bolt rotational area (circle)
9. Double faced gear wheel
10. Gear wheel
11. Gear wheel
12. Gear wheel The motor with rotary connecting rod bolt consists of a piston (1), cylinder (2), connecting rod (3), connecting rod rotary bolt gear wheel (4), connecting rod rotary bolt (5), crank shaft (6), crank shaft bolt (7), double faced gear wheel (9) and other gear wheels (10, 11, 12) (FIGS. 1, 2, 3, 4, 5).

By means of the connecting rod rotary bolt (5), one end of the connecting rod (3) is connected to the piston (1) and one end to the crank shaft (6). The connecting rod rotary bolt gear wheel (4) produced together with the connecting rod rotary bolt (5), moves on the crank shaft bolt (7). The connecting rod rotary bolt gear wheel (4) and the connecting rod rotary bolt (5) may be produced as one piece or may be assembled after being produced separately. Similarly, the gear wheels (11 and 12) may be produced as one piece or may be assembled after being produced separately.

A gear wheel (9) provided with gear teeth both on its inner and outer surfaces, is placed on the axis of the crank shaft (6). Said gear wheel (9) is associated with the connecting rod rotary bolt gear wheel (4) which is provided on the crank shaft bolt (7) and connected to the connecting rod rotary bolt (5), and moves together with the connecting rod rotary bolt gear wheel (4). Said gear wheels (10, 11, 12) which are interconnected and connected to the crank shaft (6) enables the double faced gear wheel (9) to move together with them by means of the drive of the connecting rod rotary bolt gear wheel (4) connected to the connecting rod rotary bolt (5).

The connecting rod rotary bolt gear wheel (4) rotates in the reverse direction on the crank shaft bolt (7) in the same amount as the difference between the rotation of the crank shaft (6) and that of the double faced gear wheel (9). As the crank shaft (6) turns, the connecting rod rotary bolt gear wheel (4) and the connecting rod rotary bolt (5) rotate together with said double faced gear wheel (9) supported on the crank shaft (6) axis. However, the rotary movement of the crank shaft (6) is different than that of said gear wheel (9) and due to this difference in speed of rotation, the connecting rod rotary bolt gear wheel (4) rotates the connecting rod rotary bolt (5) around the axis of the crank shaft bolt (7).

In this rotary movement, as the axes of the connecting rod rotary bolt gear wheel (4) and of the connecting rod rotary bolt (5) are not identical, the connecting rod rotary bolt (5) axis turns around the connecting rod rotary bolt gear wheel (4) and crank shaft bolt (7) axis and the rotational center of the connecting rod (3) changes during the rotary movement due to the difference of the axes.

As the connecting rod (3) moves by the connecting rod rotary bolt gear wheel (4) that moves together with the connecting rod rotary bolt (5), without being directly dependent on the movement of the crank shaft bolt (7) although the connecting rod (3) is connected to the crank shaft (6) and to the piston (1); the crank shaft (6) moves independently of the connecting rod (3). This provides the difference between the travel path of the piston (1) between the lower and upper dead points, and the rotational diameter of the crank shaft bolt (7). In this case, the connecting rod (3) makes an elliptical movement on the crank shaft bolt (7) instead of a circular movement.

The movement of the piston (1), if the connecting rod rotary bolt gear wheel (4) makes a half turn when the crank shaft (6) makes a whole revolution, is explained below and shown in FIGS. 2 and 3.

Figure 2:
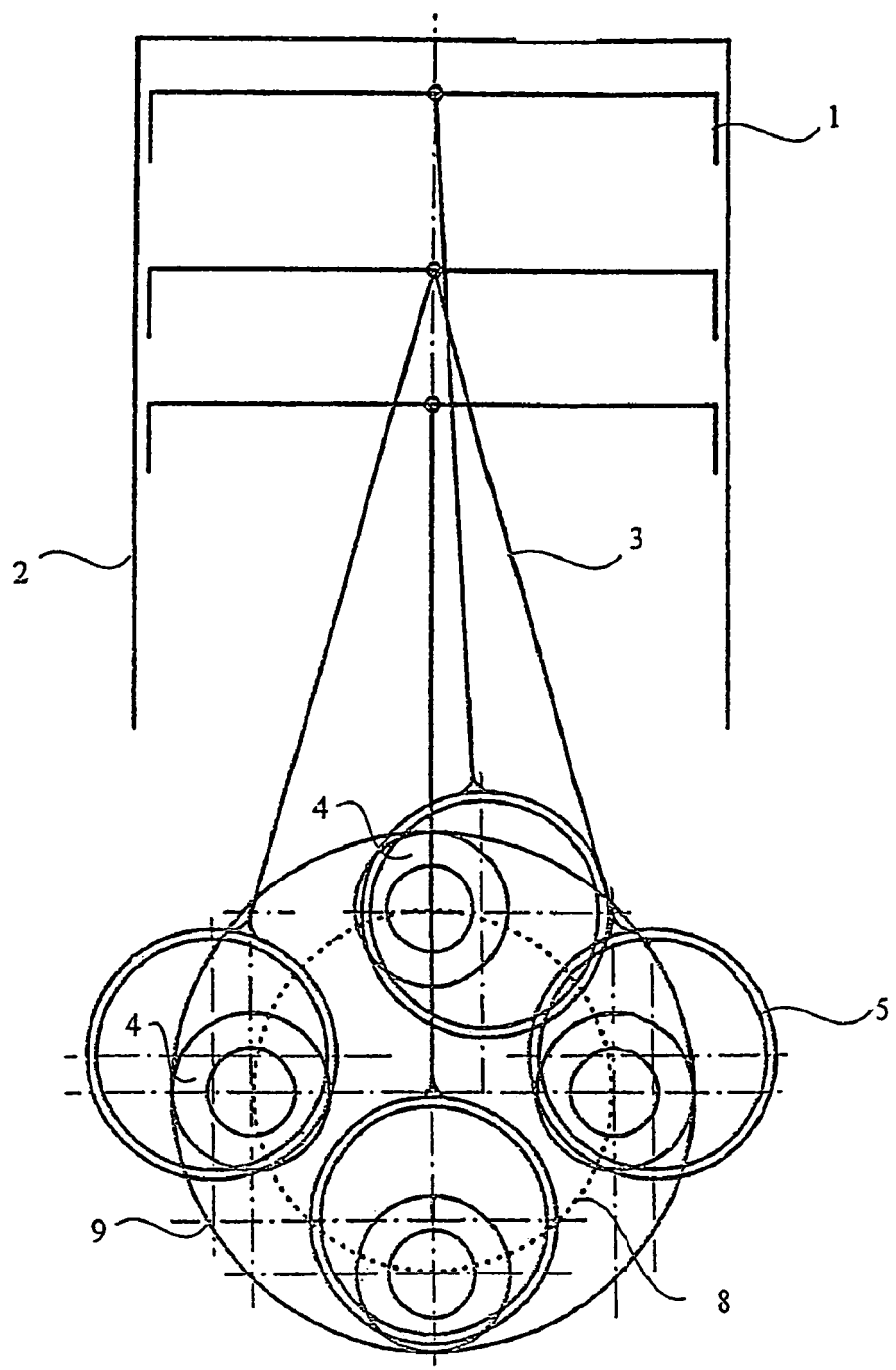
FIG. 2, is the schematic view of the motor with rotary connecting rod at expansion and exhaust strokes if the connecting rod bolt gear wheel rotates a half turn in reverse direction when the crank shaft rotates a whole turn.

In FIG. 2, the operational steps of the motor when the piston (1) moves downwards, from the upper-to the lower-dead point.

During said movement of the piston (1) in the cylinder (2), the center of the connecting rod (3) is at a higher point than the axis of the crank shaft bolt (7) in line with the movement of the connecting rod rotary bolt (5). In this case, the piston (1) applies more pressure on the crank shaft bolt (7) by means of the connecting rod (5) and furthermore, as the moment arm rotating the crank shaft (6) is big due to the movement of the connecting rod (3) center, a bigger rotating force is formed at the crank shaft (6). Also, in addition to the action of the connecting rod (3) on the crank shaft bolt (7) to rotate the crank shaft (6), the double faced gear wheel (9) and other gear wheels (10, 11, 12) also contribute to the rotation of the crank shaft (6). Due to the excessive pressure and torque applied on the crank shaft (6) the motor power is enhanced.

FIG. 2 also shows the operational steps of the motor when the piston (1) moves upwards, from the lower-to the upper-dead point. During said movement of the piston (1) in the cylinder (2), the center of the connecting rod (3) is at a lower point than the axis of the crank shaft bolt (7) in line with the movement of the connecting rod rotary bolt (5). As the piston (1) performs said upwards movement slower as compared to the crank shaft (6), the reverse force acting on the piston (1) during the exhaust stroke is weaker and thus the exhaust operation becomes easier.

Figure 3:
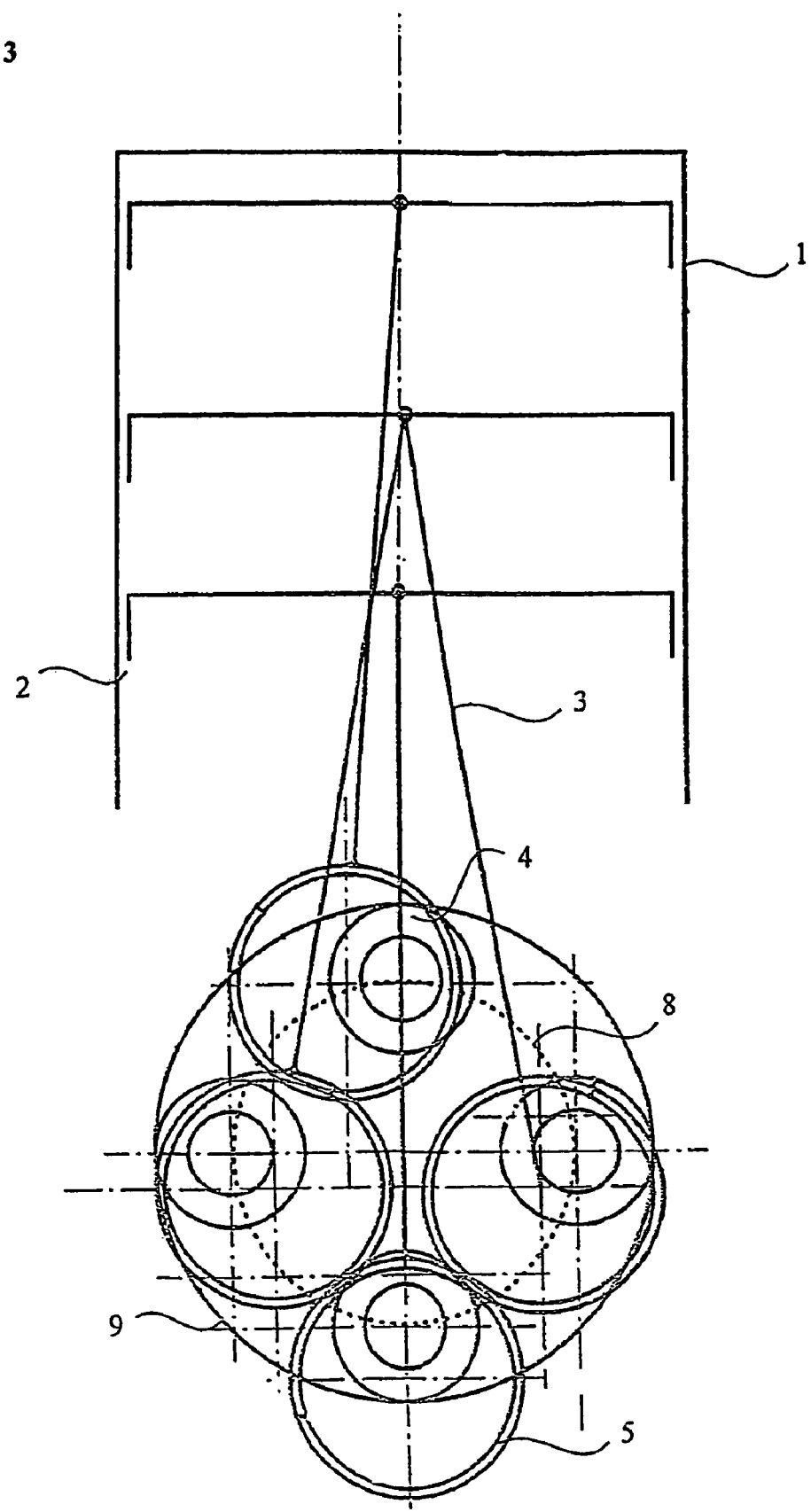
FIG. 3, is the schematic view of the motor with rotary connecting rod at admission and compression strokes if the connecting rod bolt gear wheel rotates a half turn in reverse direction when the crank shaft rotates a whole turn.

As seen in FIG. 3, the length of the piston (1) stroke in the cylinder (2) is longer than that shown in. FIG. 2. In this case, a high efficiency motor can be produced by allowing a greater amount of the air-fuel mixture into the cylinder (2).

Figure 4:
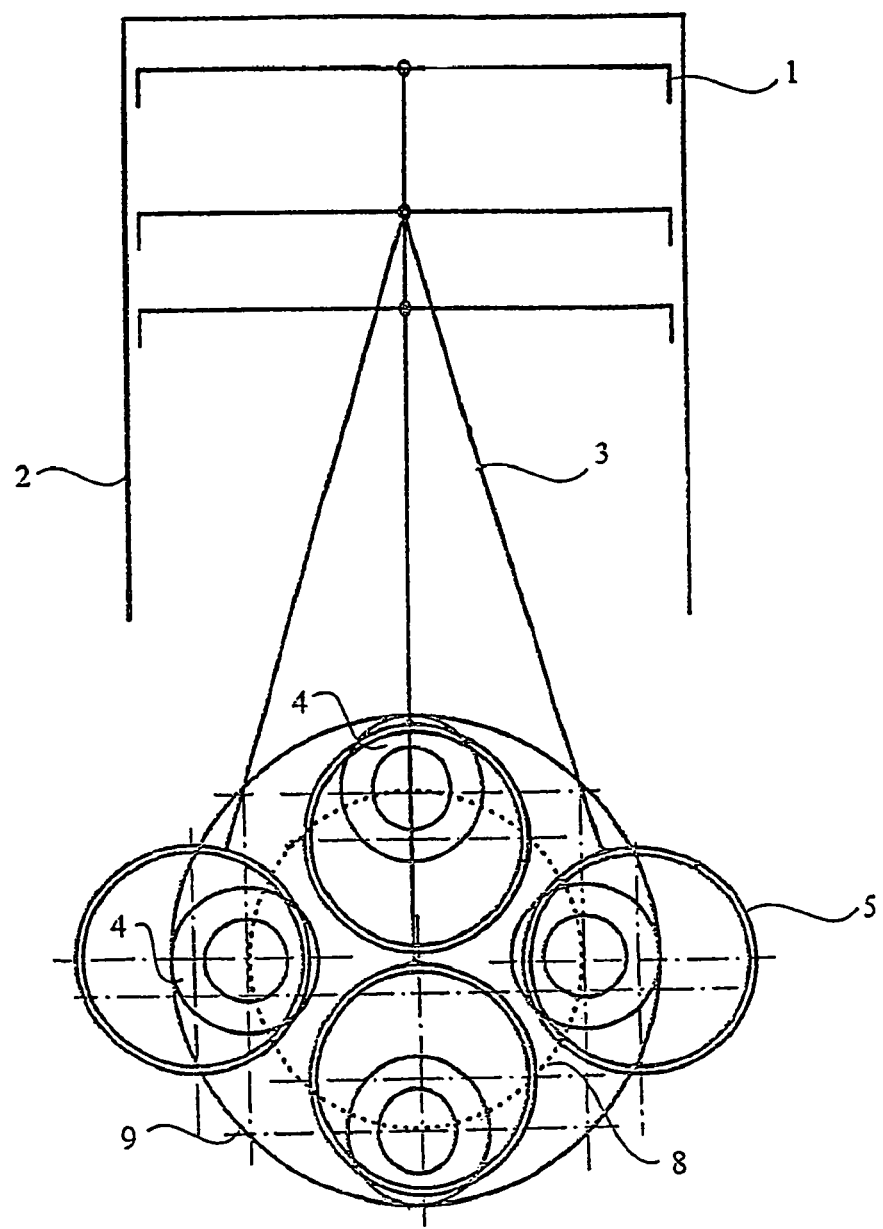
FIG. 4, is the schematic view of the piston movement of the motor with rotary connecting rod, the connecting rod bolt gear wheel rotates one turn, when the crank shaft rotates a whole turn.
Figure 5:
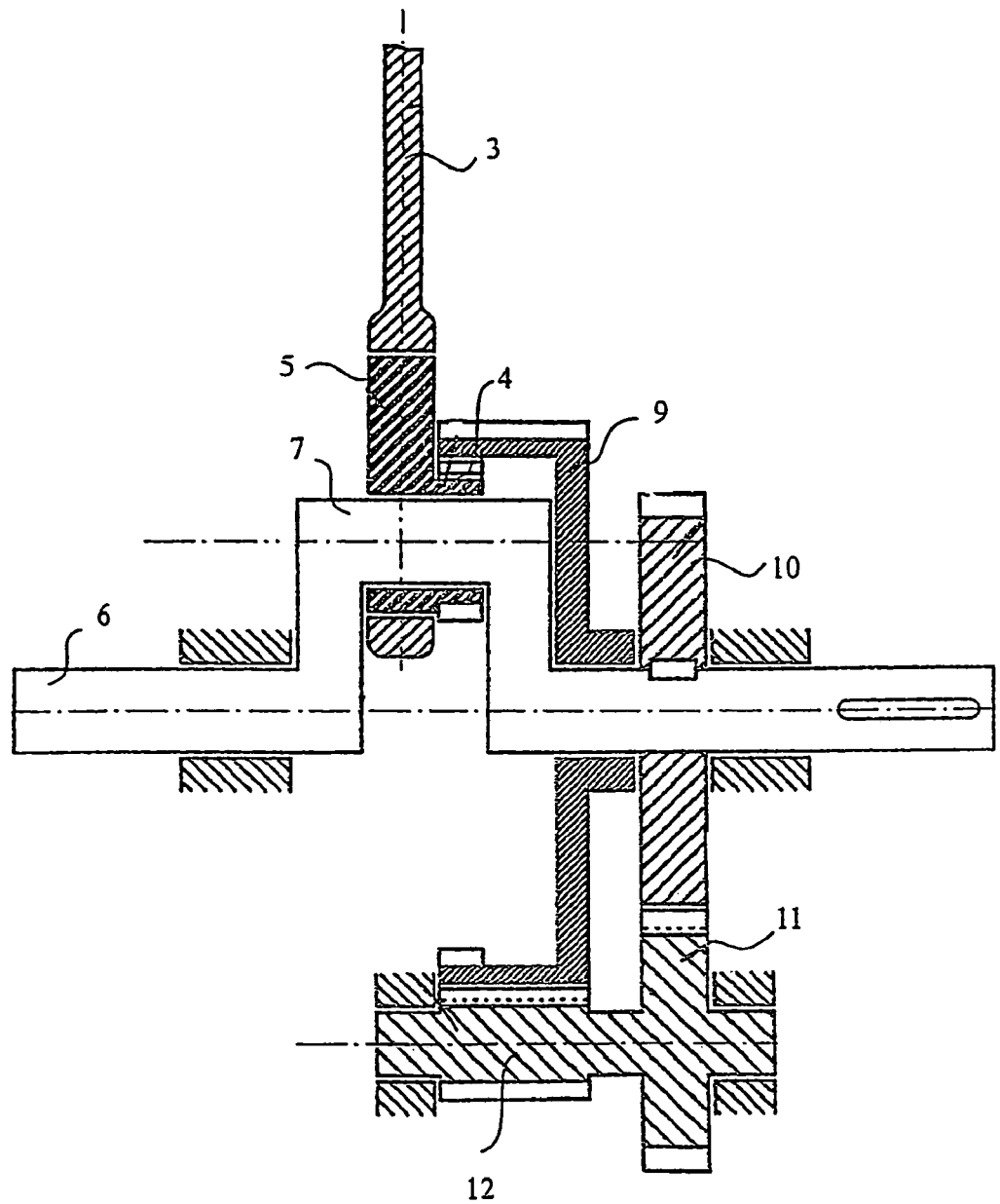
FIG. 5, shows the cross section of the motor rotary connecting rod.
Figure 6:
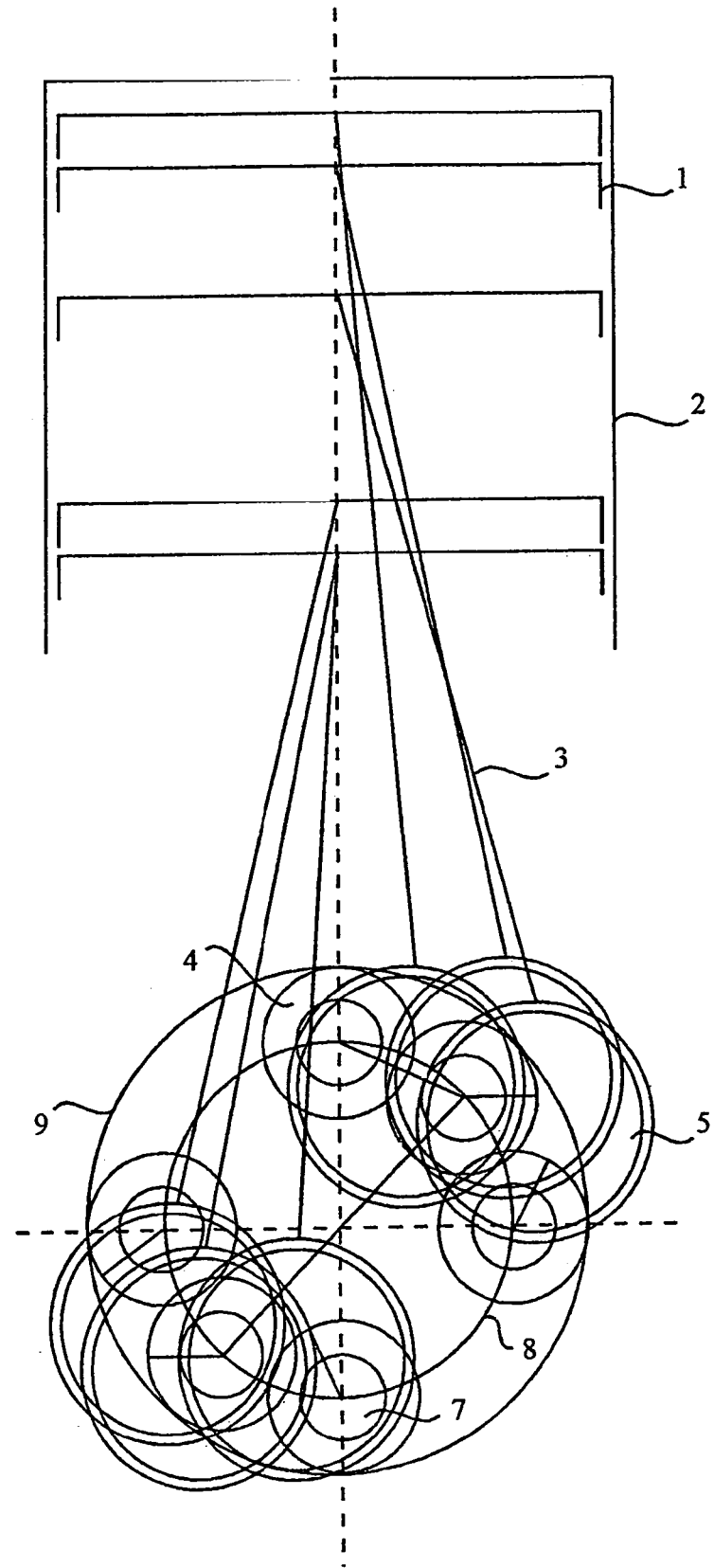
FIG. 6, is the schematic view of the movement of the piston when the rotary connecting rod bolt gear wheel maintains its position with the motor when the crank shaft rotates a whole turn.
Figure 7:
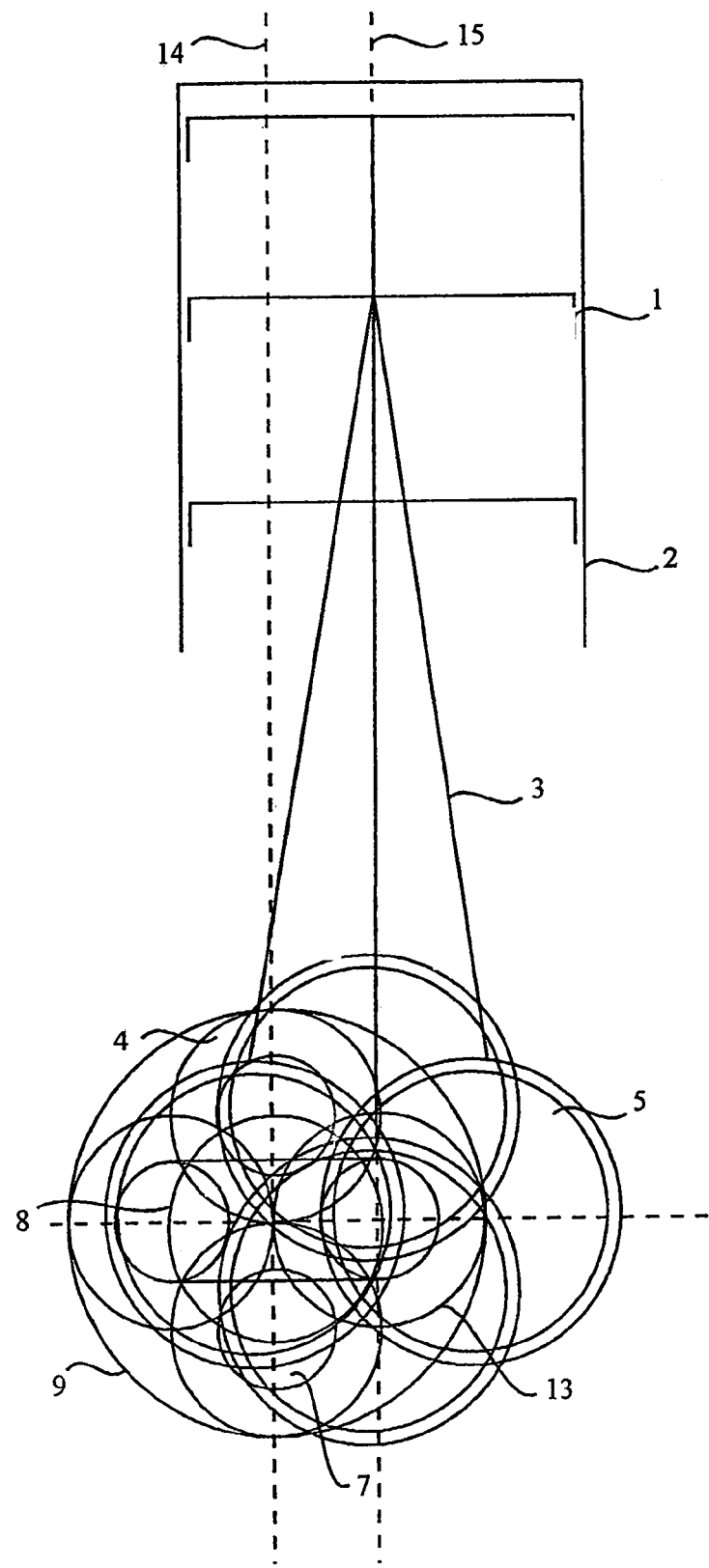
FIG. 7, is a schematic view of the movement of the piston when the rotary connecting rod bolt gear wheel rotates once in the reverse direction with the motor.

In FIG. 4, it is seen that the crank shaft bolt (7) rotational circle diameter is greater than the length of the piston (1) stroke in the cylinder (2) if the connecting rod rotary bolt gear wheel (4) rotates one turn when the crank shaft (6) rotates one turn.

In motors with rotary connecting rod bolt, as the piston (1) moves downwards, from the upper-to the lower-dead point slower than the crank shaft bolt (7), high pressure is used more efficiently and allows the use of fuels with low combustion rate and the production of high speed engines, particularly for diesel-fuel motors.

Chains, chain sprockets, electronic-and hydraulic systems may also be used instead of all gear wheels used in the present invention. Furthermore, as less delayed ignition will occur due to advanced timing in benzine-motor, the reverse force acting on the piston (1) will be smaller, thus a more silent and more efficient motor will be produced. The time allowed for ignition provides a thermodynamically useful and environment friendly motor production. Furthermore, a good ignition and a high efficiency will be provided in two-cycle motors.

What is claimed is:

1. A method for making a motor with rotary connecting rod bolt comprising the steps of coupling a piston to a cylinder; coupling a crank shaft comprising an axis to a crank shaft bolt having a crank shaft bolt axis; coupling one end of a connecting rod being movable to the piston and coupling the other end of a connecting rod being movable to the crank shaft bolt; placing a double faced gear wheel having gear teeth both on its inner and outer surfaces along the axis of the crank shaft; coupling a gear wheel 12, a gear wheel 11 and a gear wheel 10; wherein gear wheel 12 couples to the gear teeth of the outer surface of the double faced gear wheel, gear wheel 10 couples to the crank shaft, and gear wheel 11 couples to gear wheel 12 and to gear wheel 10; coupling a connecting rod rotary bolt to the crank shaft bolt; and coupling a connecting rod rotary bolt gear wheel having a connecting rod rotary bolt gear wheel axis to the connecting rod rotary bolt and to the gear teeth on the inner surface of the double faced gear wheel; wherein the piston is movingly coupled to the connecting rod and the connecting rod is movingly coupled to the crank shaft using together the crank shaft bolt that is movingly coupled to the crank shaft and the rod rotary bolt that is movingly coupled to the crank shaft by the rod rotary bolt wheel that is movingly coupled to the double faced gear wheel and the double faced gear wheel is movingly coupled gear wheel 12, gear wheel 11 and gear wheel 10.

* * * * *